Figure 1:
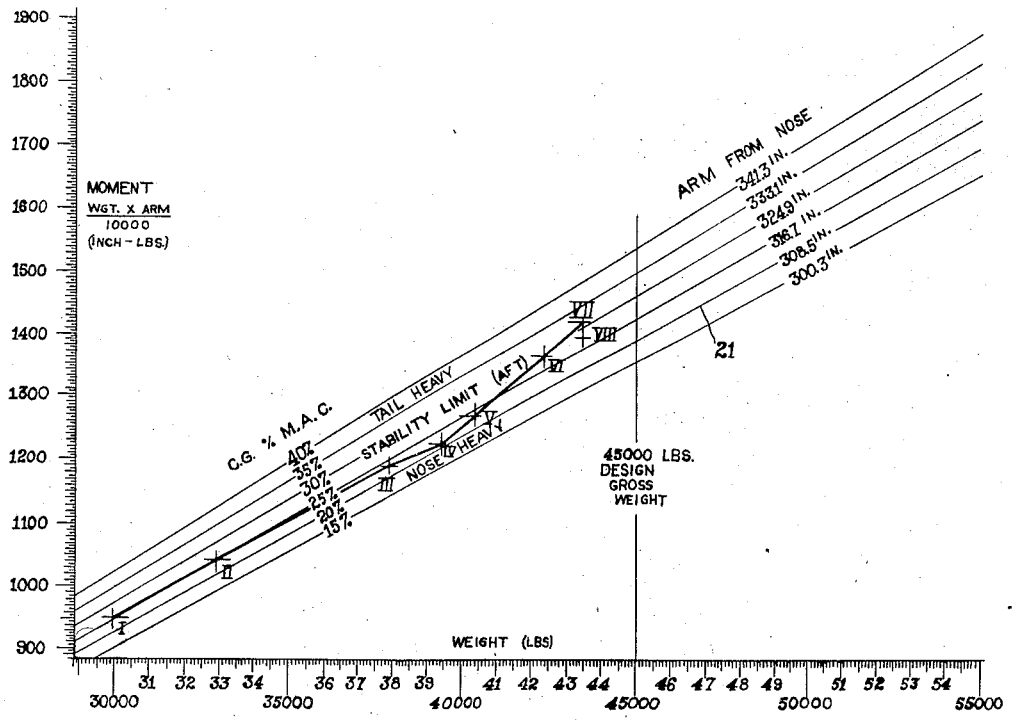

Dec. 16, 1947.   A. M. FAIRBANKS   2,432,738
WEIGHT AND BALANCE COMPUTER
Filed July 16, 1943   3 Sheets-Sheet 1

INVENTOR
ANTHONY M. FAIRBANKS
BY
ATTORNEY

Dec. 16, 1947.   A. M. FAIRBANKS   2,432,738
WEIGHT AND BALANCE COMPUTER
Filed July 16, 1943   3 Sheets-Sheet 2
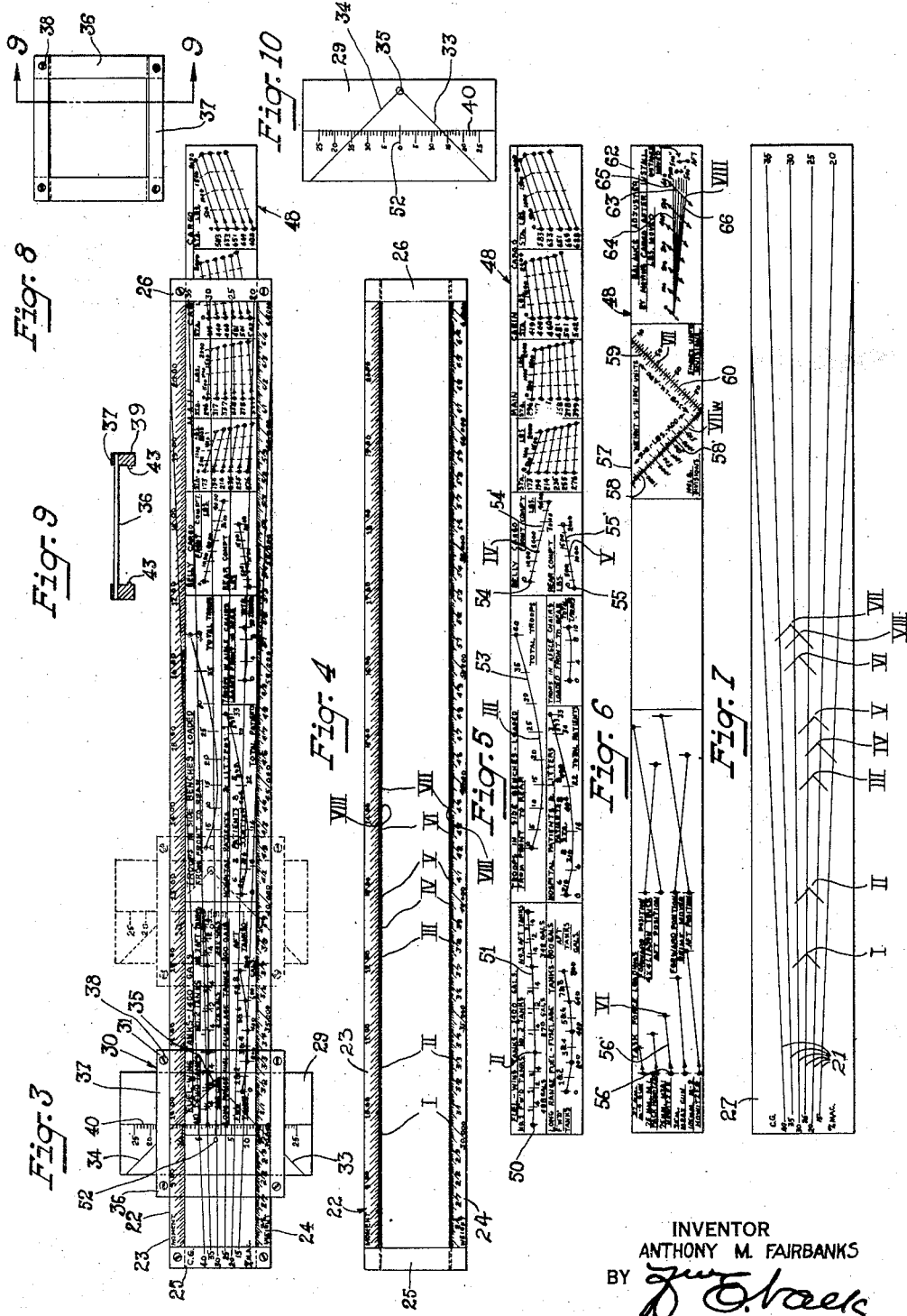
INVENTOR
ANTHONY M. FAIRBANKS
BY
ATTORNEY

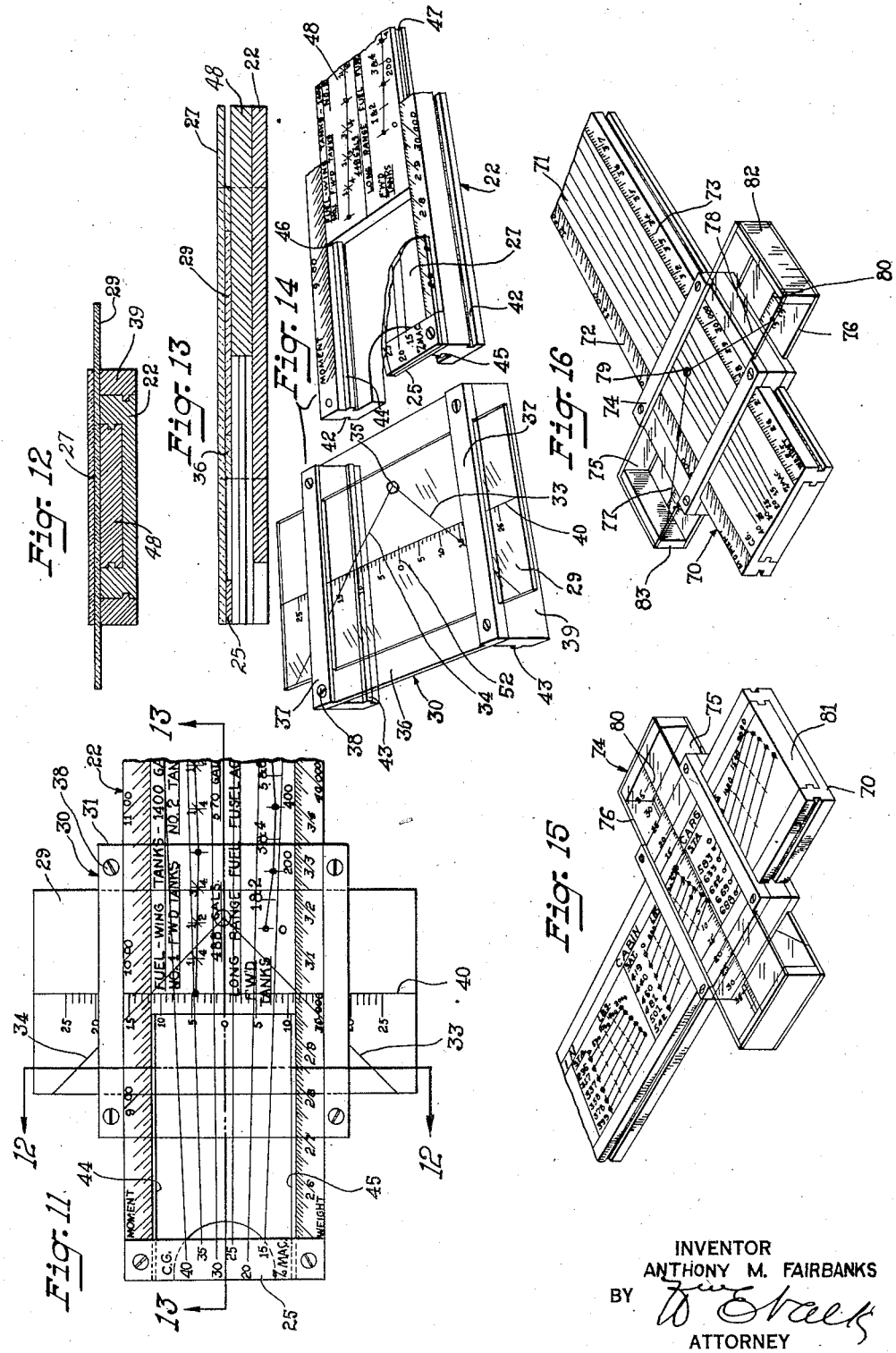

Patented Dec. 16, 1947

2,432,738

UNITED STATES PATENT OFFICE 2,432,738

WEIGHT AND BALANCE COMPUTER

Anthony M. Fairbanks, Buffalo, N. Y., assignor to Curtiss-Wright Corporation, a corporation of Delaware Application July 16, 1943, Serial No. 495,002

6 Claims. (Cl. 235—61)

This invention relates to computing devices and more particularly to devices for computing the gross weight and center of gravity locations for airplanes.

In the loading of airplanes it is imperative at all times that the gross weight and center of gravity location be known for any given loading condition. If a part of the load is taken from the airplane or some of the load is shifted about within the airplane, a new calculation is made to determine these factors. The usual charts and mathematical calculations are difficult and tedious to use in the figuring out of these factors. With the cargo airplanes coming into general use, much time will be wasted in the making of these calculations and the airplane time schedule interfered with, unless some way is had which will cut down the time involved in ascertaining the desired information.

It is therefore an object of the present invention to provide a device for computing the gross weight and center of gravity locations for an airplane which requires no more effort to compute with the same than that required to operate an ordinary slide rule, and in which the procedure is similar thereto.

It is another object of the present invention to provide a slide rule computing device whereby a record may be kept at all times on the device and wherein any changes or alterations in the cargo or personnel in the airplane can readily be made on the device without the necessity of having to go through the complete calculations for the airplane each time a change is made.

According to the present invention, there has been provided a computing device constructed similar to that of a slide rule on which weight and moment can be added or subtracted by simply locating the slide portion of the device and repositioning the indicator. There is a base scale or chart in which center of gravity locations are plotted against weight and moment from which, for a given weight and moment, the gross weight and center of gravity location can be readily taken. For the particular airplane in question, it has been determined that the center of gravity location lies within 20 to 35 per cent of the mean aerodynamic chord. If the center of gravity varies from this range, this will be readily apparent from the device. Slidable upon the base scale is a cooperating slide having graph lines respectively representative of the summations of weight and moment taken from the graph of the base scale. These graph lines are determined for a plurality of different known loads and known locations at which the loads are placed in the airplane, and as the slide is moved into position to add these weights to the airplane and the indicator brought to the new position, the center of gravity location and gross weight can be readily taken off the base scale. In addition to graphs for known weights and moment arms, there is provided a scale for determining the center of gravity location when miscellaneous equipment is added and arranged at locations in the airplane other than those locations where the regular equipment is placed. Also, there is a scale wherein any change of the load within the airplane after it has been loaded or in flight can readily be accounted for on the device.

Figure 2:
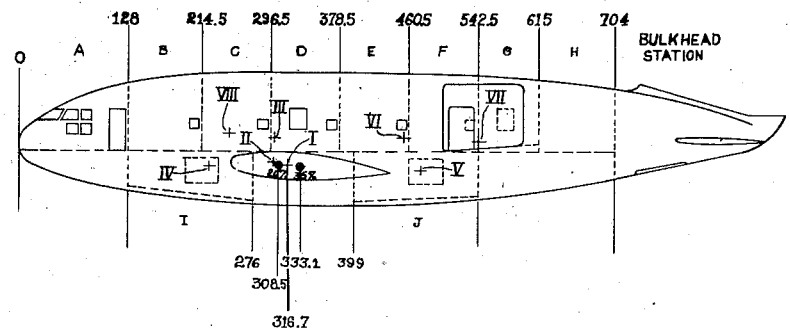

For other objects and for a better understanding of the invention, reference may be had to the following detailed description taken in connection with the accompanying drawing, in which Fig. 1 is a chart such as ordinarily used by aeronautical engineers for recording the gross weight and center of gravity locations, the chart having center of gravity lines plotted against moment and weight. Fig. 2 is a diagrammatic view of the fuselage of a well known cargo airplane with certain of its stations marked off to show the distances from the reference point which is in this instance located at the nose of the fuselage. Fig. 3 is a plan view of the device showing the slide withdrawn slightly and the indicator positioned at the near end of the slide ready to be moved to a new position indicated in dotted lines. Fig. 4 is a plan view of the base scale with the slide and with the center of gravity scale removed. Fig. 5 is a plan view of one side of the slide, while Fig. 6 is a plan view of the opposite side of the slide. Fig. 7 is a plan view of the center of gravity scale which is secured to and made a part of the base scale. Fig. 8 is a plan view of the indicator frame adapted to slide on the base scale, while Fig. 9 is a sectional view of the indicator frame taken along the line 9—9 of Fig. 8. Fig. 10 is an index plate carried in the frame to be movable transversely with respect thereto. Fig. 11 is an enlarged view of one end of the rule and of the indicator showing more clearly the various indicia thereon. Fig. 12 is an enlarged view in section taken through the indicator and along the line 12—12 of Fig. 11. Fig. 13 is a sectional view taken through the indicator in another direction and along the line 13—13 of Fig. 11. Fig. 14 is an exploded perspective view showing the indicator removed from one end of the rule. Figs. 15 and 16 are perspective views of a modified form of the device showing first one side of the device and then the other side of the device. Figs. 17 and 18 are enlarged views of portions of Fig. 6. Figs. 19, 20 and 21 are similarly enlarged views of portions of Fig. 5.

Referring now particularly to Figs. 1 and 2, there is shown a graph chart and a diagrammatic view of a fuselage of a standard cargo airplane. In Fig. 1, there is plotted on the base line the gross weight starting with approximately 30,000 pounds and carried upwardly to 55,000 pounds. On the ordinate side of the graph, there is provided a moment arm scale starting from approximately 900 inch pounds and increasing upwardly to 1900 inch pounds, these amounts being $\frac{1}{10,000}$ of the total or calculated amounts. Knowing the weight, the amount indication is determined by multiplying this weight by the arm or distance from a reference point 0 to the load placed in the airplane and dividing by 10,000.

Within the diagrammatic view of Fig. 2, there is located the range of center of gravity within which this particular airplane can fly, this range lying between 20 and 30 or possibly 35 percent of the mean aerodynamic chord. The distance of the 20 percent chord from the reference line 0 is 308.5 inches whereas the distance of the 35 percent chord is 333.1 inches from the reference line 0. From experience and if possible, it would be best to keep the center of gravity at a location of 25 percent of the mean aerodynamic chord or 316.7 inches from the reference point 0. Knowing these distances, a group of lines can be plotted on the moment-weight chart as indicated at 21. For this particular airplane, the gross weight of the airplane without fuel and including a crew of three approximates 30,000 pounds and this particular airplane is designed to carry, in addition to this weight, a load of approximately 15,000 pounds. This load of 15,000 pounds must be so located in the airplane that the center of gravity location is within the 20 to 30 percent range. If it should be so loaded that the center of gravity location was below the 20 percent line, the airplane would be nose heavy, while if the center of gravity location was found to be above the 30 percent line, the airplane would be tail heavy and tend to rotate rearwardly about its center of gravity.

For the computing of the gross weight and the center of gravity location, the present device has been provided. After a brief description of the device the operation of the same can best be understood by following through with a particular loading arrangement such as would be presented to the operators of the airplane in the field.

As shown in Figures 3 and 4, the chart shown in Figure 1 with the center of gravity lines, has been placed on a base scale 22 having two parallel indicia-bearing portions 23 and 24 on which are disposed end spacing plates 25 and 26 on which is secured a transparent plate 27 having the center of gravity lines 21 thereon. The connection of the plate 27, as viewed more clearly in Figs. 12, 13, and 14, is such that it is slightly spaced above the upper face of the parallel portions 23 and 24 in order to permit the sliding over the scale of an indexing plate 29 of an indicator 30. This plate 29 is carried in a square indicator frame 31 and when this frame and the plate 29 are in position on the base scale 22, the plate can be adjusted laterally across the face of the base scale 22.

On the portion 23 there are disposed at a 45° angle, the moment indications of the chart, Fig. 1, while on the portion 24 there is disposed at a 45° angle, indicia indicating the gross weight. On the plate 29 there are two index lines 33 and 34 running at 45° and in opposite directions adapted to intersect at a point 35 and which line up respectively with the indicia on the moment and weight portions 23 and 24. A center of gravity reading is taken on the scale 27 at the position where point 35 is aligned with such scale.

The indicator frame 31 consists of transverse frame members 36 and longitudinally extending frame members 37 integral with each other and secured to bead carrying portions 39 by screws 38 in each corner of the frame. The plate 29 is adjustable transversely through the frame and, in addition to the index lines 33 and 34, has an arbitrary numerical scale 40. The outer edges of the portions 23 and 24 have grooves 42 adapted to receive beads 43 on the portions 39 of the indicator frame. These beads prevent the indicator from being separated from the base scale 22. The indicator frame is also prevented from becoming separated from the base scale 22 by the transverse frame members 36 located in the space between the center of gravity scale 27 and the base scale 22. The longitudinal extent of movement of the indicator is limited by the end plates 25 and 26.

On the inner edges of the portions 23 and 24, there are provided respectively longitudinally extending beads 44 and 45 adapted to match with grooves 46 and 47 of a cooperating slide scale 48. On this slide scale there are provided, as shown more clearly in Figs. 5, 6, 17, 18, 19, 20 and 21, graph lines representative of a variety of standard loads taken by cargo airplanes of this type. Such loads include that of fuel, troops, guns, and other equipment with which the airplane would be loaded upon the same taking off for a military mission. The graph lines are drawn to the same scale as that of the base scale and when moved into position for adding of this load to the indicated gross weight of the airplane, will indicate upon the indicator being properly positioned over the selected graph line point, the new gross weight and center of gravity location on the base scale.

A given problem may taken the form defined in the following table:

| Nature of Weight | Weight, lbs. | Cumulative Weight | Arm | Moment $\frac{Wgt.\times arm}{10,000}$ | Cumulative Moment | Per cent M. A. C. |
|---|---|---|---|---|---|---|
| I. Wgt. of airplane with crew of 3 | 30,000 | 30,000 | 317 | 951 | 951 | 25 |
| II. Forward Fuel Tank (488 gals.) | 2,928 | 32,928 | 304 | 89 | 1,040 | 24 |
| III. 24 Troops in Side Benches | 5,000 | 37,928 | 300 | 150 | 1,190 | 23 |
| IV. Belly Cargo | 1,500 | 39,428 | 227 | 34 | 1,224 | 21 |
| V. Cargo—rear Compartment | 1,000 | 40,428 | 470 | 47 | 1,271 | 23 |
| VI. Cabin Cargo (75 mm. Howitzer) | 2,000 | 42,428 | 460 | 92 | 1,363 | 28 |
| VII. Cabin Cargo (Food, Ammunition, etc.) | 1,000 | 43,428 | 542 | 54 | 1,417 | 32 |
| VIII. Cabin Cargo (Moved 600 lbs. of VII 400 in. forward) | 600 | 43,428 | −400 | −24 | 1,393 | 27 |

Assuming the weight of the airplane and its crew of three at 30,000 pounds, the index plate 29 is first positioned so that the line 33 will lie on the index 30,000 of the weight portion 24 and the index line 34 is arranged to lie on the moment scale at 951. With the index plate 29 so located, the intersection 35 of the lines 33 and 34 will indicate on the center of gravity scale 27 a center of gravity of 25 percent of the mean aerodynamic chord. This indication is found at point I on Figure 1. To this airplane there is added to the forward fuel tanks enough gasoline to totally fill them or 2,928 pounds which will bring the gross weight up to 32,928 pounds. With the zero point 50 of the wing fuel tank graph line 51 on the slide 48 positioned in alignment with the arbitrary scale 40 of the plate 29, a reading is taken of the point with reference to a zero indication 52 on the scale 40. Assuming that the zero point 50 is four spaces above the index zero 52, this spacing of four points between the zero indication 52 and the graph line 51 will be maintained as the indicator 30 is moved along to be in vertical alignment with point II (indicating forward fuel tanks full) of the scale 51. It will be noted that this graph line 51 takes a slight slope downwardly for the forward fuel tanks. With the indicator and its indexing plate 29 located in the new position, the new center of gravity reading is taken. It is found that this new reading is at 24 percent of the mean aerodynamic chord and well within the permissible range.

Assuming now that is desired to load the airplane with 24 troops seated in side benches, a graph line 53 on the slide scale 48 is used. The slide is moved along so that zero point of the graph line 53 is located in alignment with the index line 40. The number of spaces on the scale 40 between the zero 52 and the zero point of the graph line 53 is noted and the indicator is then moved to a new position where the index line 40 will intersect line 53 at point III, indicating 24 troops, while maintaining the noted number of spaces between the zero indication 52 and the graph line 53. The new center of gravity reading is then found to be 23 and the gross weight will be 27,928 pounds. All this is accomplished without having to multiply the added weight by the moment arm or align line 34 of the index plate 29 with the moment scale. The seating of troops within the plane is standardized for the different number of men and the moments are given directly from the graph line 53 corresponding to the selected number of troops to be transported which in this instance was 24.

Along with the troops there is added, within the belly of the airplane and forwardly of the center of gravity thereof, 1500 pounds. The slide 48 is then moved so that a zero point 54 is put in alignment with the arbitrary scale 40 of the index plate 29. The indicator is then moved, maintaining the spacing on the arbitrary scale 40, until the line 40 is in alignment with a point IV or 1500 pounds on the front compartment belly cargo scale 54'. The new center of gravity location is then found to be at 21 percent. It will now be noted that neither the gross weight nor the center of gravity has been changed sufficiently to prevent the airplane from flying under the new gross loading of 39,428 pounds. A similar manipulation is effected when 1000 pounds is added to the rearward belly cargo compartment by the use of scale 55'. The zero point in this case is indicated at 55 and the final setting at point V.

Assuming now that a 75 mm. M3A1 howitzer is to be added, the slide 48 is reversed to present under the indicator the opposite face thereof, Figs. 6, 17 and 18. The slide, upon being reinserted into the base scale, is moved along until a zero mark 56 of a graph line 56' is in alignment with the scale 40. After noting the displacement on line 40, the indicator is then moved along, while maintaining the displacement on scale 40, until the scale 40 is aligned with point VI. It so happens that this howitzer weighs about 2,000 pounds. The gross weight of the airplane is then brought up to the gross weight of 42,428 pounds and the new center of gravity reading is 28 and still within the permissible center of gravity range.

Other loading may take the form of food and ammunition whose weight is known, but on which no predetermined graph line is had on the slide scale 48. For this purpose, a section 57 of the slide is used. The slide 48 is brought to a point where a scale 58 is aligned with the line 34 of the index plate 29. Assuming that the point 35 in this position is in line with a point 58' on scale 58, the line 34 is then run down the scale 58 by appropriate movement of the index plate 29 and the indicator 30, until the point 35 is in alignment with the point VII$_w$ on scale 58. The distance between the points 58' and VII$_w$ on the scale 58 represents the amount of added weight such as in the form of food or ammunition. A correction must now be made to determine the new moment and center of gravity location. This is accomplished by moving the slide along until the index point 35 is aligned with a moment or index unit scale 59. It is found that the point 35 will arrive at point 60 on this scale. The point 35 is then forced to travel upwardly, by moving index plate 29 and indicator 30, to add the new moment arm and is found to arrive at point VII on the scale 59. The distance between the points 60 and VII on the scale 59 represents the moment arm of the added weight. The accumulative moment arm is now found to be 1417 and the center of gravity location is above the permissible range or at 32. Even though the gross weight is at 43,428 and within the design gross weight of the airplane, the airplane will technically be unable to get off the ground with a degree of safety with its load. Shifting or readjustment of the load must therefore take place.

It is found that of this last added cargo, that 600 pounds of the same can be segregated from the 1,000 pounds mass and also that there is space forwardly in the airplane to put the 600 pounds at a distance of 400 inches from the present location. The weight remaining constant, it is now necessary to make the new correction for the moment arm, which correction is found to be a difference of 240,000 inch pounds. The indicator is permitted to remain at its station VII and the slide is moved along so that use may be made of the section 62 thereon. This section is known as the balance adjusting section. Since 600 pounds are to be moved, the intersection 65 of a top line 64 with a line 63 marked 600 is brought into alignment with the scale 40 of the indicator 29. The point on the scale 40 which is in alignment with point 65 is then noted, and this point on scale 40 moved downwardly along line 63, by appropriate movement of index 29 and indicator 30. This movement is continued until a point VIII on the line 66, the fourth from line 64, or the next to the bottom line, indicating a shift of 400 inches from line 64, is in alignment with the noted point on scale 49. This has been effected without any change of the line 33 of the index plate 29 on the weight indicia portion 24, the change having taken place only on the moment arm portion 23. Upon checking with the intersection 35, it is found that the new center of gravity location has been altered and now reads 27. Hence, the airplane with this same total load of 43,428 pounds, may now safely take off the ground.

Shown particularly in Figs. 15 and 16 is a modified form of scale in which the transparent plate 27 bearing center of gravity locations is dispensed with, and instead, the center of gravity locations or lines are disposed on the back of a base scale 70 as indicated at 71. These lines 71 are fixed the same as in the other form of the invention with respect to moment and weight scales 72 and 73. An indicator frame 74 carries two plates 75 and 76 located respectively on both sides of the base scale 70. The plate 75 has the usual diagonal lines 77 and 78 intersecting at a point 79 for indicating the center of gravity location on the center of gravity scale 71. The plate 76 bears the arbitrary scale 80 which is arranged to be aligned with the graph lines of a slide 81 fitted in the reverse side of the base scale. The operation of the scale is the same except that the scale must be turned over from one side to the other to take the readings. The plates 75 and 76 are held in spaced relation by end members 82 and 83. Both plates are movable transversely across the base scale and through the frame 74.

It should now be apparent that there has been provided a computing device, similar to an ordinary slide rule and as simple to operate, for computing the gross weight and center of gravity locations of an airplane for given loading conditions thereof. While the invention has been described with reference to several specific embodiments thereof, it is understood that various changes may be made in the detail construction and arrangement of the device, within the spirit and scope of the present invention as defined by the appended claims.

I claim as my invention:

1. A slide rule for computing the gross weight and center of gravity location for airplanes, comprising an elongated base member having marked thereon weight and moment of forces scales and a center of gravity graph, an index member movable transversely and longitudinally with respect to said base member, an elongated slide member mounted on said base member for movement longitudinally thereof, graph lines on said elongated slide member for computing the effect of loads on the weight and center of gravity of said airplane, indicia on said index member for maintaining a predetermined position of said index member with respect to said graph lines on said elongated slide member, and indicia on said index member for alignment with said weight scale and said center of gravity graph to indicate the weight and locate the center of gravity of said airplane.

2. A slide rule for computing the gross weight and center of gravity location for airplanes, comprising an elongated base member having marked thereon weight and moment of forces scales and a center of gravity graph, an index member movable transversely and longitudinally with respect to said base member, an elongated slide member mounted on said base member for movement longitudinally thereof, a plurality of graph lines on said elongated slide member respectively representative of the summation of weight and moment of different kinds of loads located in different parts of said airplane for computing the effect of loads on the weight and center of gravity of said airplane, indicia on said index member for maintaining a predetermined position of said index member with respect to said graph lines on said elongated slide member, and indicia on said index member for alignment with said weight scale and said center of gravity graph to indicate the weight and locate the center of gravity of said airplane.

3. A slide rule for computing the gross weight and center of gravity location for airplanes, comprising an elongated base member, having marked thereon weight and moment of forces scales and a center of gravity graph, an indicator member mounted on said base member for movement longitudinally thereof, an index member mounted on said indicator member for movement substantially at right angles to the movement of said indicator member, an elongated slide member mounted on said base member for movement longitudinally thereof, graph lines on said elongated slide member for computing the effect of loads on the weight and center of gravity of said airplane, indicia on said index member for maintaining a predetermined position of said index member with respect to said graph lines on said elongated member, and indicia on said index member for indicating the weight and locating the center of gravity of said airplane, by alignment with said weight scale and center of gravity graph.

4. A slide rule for computing the gross weight and center of gravity location for airplanes, comprising an elongated base member having marked thereon weight and moment of forces scales and a center of gravity graph, an indicator member mounted on said base member for movement longitudinally thereof, an index member mounted on said indicator member for movement substantially at right angles to the movement of said indicator member, an elongated slide member mounted on said base member for movement longitudinally thereof, graph lines on said elongated slide member for computing the effect of loads on the weight and center of gravity of said airplane, and a pair of reference lines on said index member intersecting at right angles to each other and one of said lines crossing said weight scale and the other of said lines crossing said moment of forces scale, the point on said weight scale at which said one line crosses said weight scale indicating the weight of said airplane, and the point on said center of gravity graph which is in alignment with the intersection of said reference lines locating the center of gravity of said airplane.

5. A slide rule for computing the gross weight and center of gravity location for airplanes, comprising an elongated base member having marked thereon weight and moment of forces scales and a center of gravity graph, an indicator member mounted on said base member for movement longitudinally thereof, an index member mounted on said indicator member for movement substantially at right angles to the movement of said indicator member, an elongated slide member mounted on said base member for movement longitudinally thereof, a plurality of graph lines on said elongated slide member respectively representative of the summation of weight and moment of different kinds of loads located in different parts of said airplane for computing the effect of loads on the weight and center of gravity of said airplane, indicia on said index member for maintaining a predetermined position of said index member with respect to said graph lines on said elongated slide member, and indicia on said index member for indicating the weight and locating the center of gravity of said airplane by alignment with said weight scale and said center of gravity graph.

6. A slide rule for computing the gross weight and center of gravity location for airplanes, comprising an elongated base member having marked thereon weight and moment of forces scales and a center of gravity graph, an indicator member mounted on said base member for movement longitudinally thereof, an index member mounted on said indicator member for movement substantially at right angles to the movement of said indicator member, an elongated slide member mounted on said base member for movement longitudinally thereof, a plurality of graph lines on said elongated slide member respectively representative of the summation of weight and moment of different kinds of loads located in different parts of said airplane for computing the effect of loads on the weight and center of gravity of said airplane, and a pair of reference lines on said index member intersecting at right angles to each other and one of said lines crossing said weight scale and the other of said lines crossing said moment of forces scale, the point on said weight scale at which said one line crosses said weight scale indicating the weight of said airplane, and the point on said center of gravity graph which is in alignment with the intersection of said reference lines locating the center of gravity of said airplane.

ANTHONY M. FAIRBANKS.

REFERENCES CITED

The following references are of record in the file of this patent:

UNITED STATES PATENTS

| Number | Name | Date |
| --- | --- | --- |
| 2,179,822 | Imm | Nov. 14, 1939 |
| 2,193,280 | Gunning | Mar. 12, 1940 |

FOREIGN PATENTS

| Number | Country | Date |
| --- | --- | --- |
| 468,996 | Great Britain | July 16, 1937 |